United States Patent [19]
Howell

[11] 3,719,079
[45] March 6, 1973

[54] AIR MOMENTUM ANEMOMETER
[76] Inventor: Wallace E. Howell, P. O. Box 243, Lexington, Mass. 02173
[22] Filed: April 5, 1971
[21] Appl. No.: 131,120

[52] U.S. Cl..................73/194 R, 73/189, 73/228
[51] Int. Cl.................................G01f 1/00
[58] Field of Search ....73/189, 194, 194 M, 202, 228

[56] References Cited

UNITED STATES PATENTS

| | | | |
|---|---|---|---|
| 3,038,334 | 6/1962 | Li | 73/194 M |
| 2,060,848 | 10/1936 | Boyle | 73/202 |
| 2,897,672 | 8/1959 | Glasbrenner et al. | 73/228 |
| 3,343,413 | 9/1967 | South et al. | 73/194 |

Primary Examiner—Richard C. Queisser
Assistant Examiner—John P. Beauchamp
Attorney—Richard P. Crowley and Richard L. Stevens

[57] ABSTRACT

A device for the measurement of horizontal wind velocity, especially low wind velocity. The horizontal component of momentum of the airstream is displaced from its normal flow. This is accomplished by either injecting an air jet into the airstream to displace the horizontal component of momentum, or withdrawing from the airstream the horizontal component of momentum by passing the airstream over an inlet into which inlet is drawn the horizontal component of the momentum flux of the airstream. The momentum of the air is converted to a force which is thus sensed and measured by a transducer, and since the force transduced is proportional to the first power of wind speed, large forces which may be accurately measured at low wind speeds are achieved.

13 Claims, 5 Drawing Figures

INVENTOR
WALLACE E. HOWELL
BY Crowley & Stevens
ATTORNEYS

AIR MOMENTUM ANEMOMETER

BACKGROUND OF THE INVENTION

My invention is directed to a device for the measurement of wind velocity, particularly velocities at very low speeds. Presently available today are a number of types of anemometers, but all are subject to deficiencies or shortcomings at low wind speeds. One group of anemometers comprises cups or propeller-like mills that are moved by the wind at rates of speed roughly proportional to the wind speed. These generally function well at moderate wind speed where the force causing the motion is large compared to the frictional forces in the instruments themselves; but most anemometers of this type become unreliable at wind speeds of less than about 0.5 meters per second and tend to stall at some speed not much lower than this. A second type of an anemometer is operated by the pressure of the wind on a pressure sensor of some sort. One type of anemometer or fluid measuring device wherein pressure differentials are measured is exemplified by U.S. Pat. No. 3,343,413, South. Another type may be similar to the air speed indicator of an airplane, or, in a primitive form, may be nothing more complicated than a hanging plate blown away from the vertical by the force of the wind. This type of device suffers from the fact that the pressure of the wind is proportional to the square of its velocity and at very low velocities the square becomes very small indeed. For example, a wind of 10 centimeters per second exerts a pressure of only $6 \times 10^{-2}$ dynes per centimeters square. Thus it would have to impinge on the surface of about 1.7 square meters to exert a force equivalent to the weight of 1 gram.

Still another type of anemometer widely used for very low wind speeds is the hot wire or hot film type in which heat removal from a very fine wire or filament increases with wind speed. These instruments have not become particularly widespread in the field because of the mechanical fragility and electrical complication; for instance, involved with the necessity of taking the square root of the fluctuations in the hot wire resistance as a measure of wind pressure and the fourth root as a measure of velocity; and interference from fog, rain, and snow. Still a further anemometer depends upon the Doppler effect by which the sound waves are propagated at the speed of sound plus the vector speed of wind and so cover different distances and different directions in a given time depending upon the speed and direction of wind.

SUMMARY OF THE INVENTION

My invention is directed to a device and method which operates by sensing and measuring the momentum of air which unlike the pressure varies linearly with wind velocity. The velocity of the air to be measured in the environment flowing along a path is displaced from its travel along said path by a force acting substantially normal to the direction of flow of the airstream.

The energy flux due to the motion of a stream of air, equal to the mass flux times half the square of the velocity, may be interpreted as a dynamic pressure operating over the cross-section area of the stream, or alternatively as the momentum flux times half the velocity. My invention is a device that transduces the momentum flux of a sampled portion of the airstream into a force proportional to the wind velocity with a transducer for measuring the magnitude and direction of this force.

The motion of an air stream includes not only the velocity of stream as a whole but also its vorticity, so that vortical momentum flux is also a property of the air stream. In this specification, the term velocity includes the vortical as well as translational components of the motion of the air stream and the term momentum or momentum flux includes the vortical as well as orthogonal components of momentum or momentum flux, and force includes the rotational as well as translational components of the net force.

The momentum flux of a sample of the environmental air is converted into a force proportional to that momentum exerted on an element of the device in such a manner that the force may be measured. The force developed is proportional to the first power of the wind velocity. All devices presently available in the state of the art that transduce forces from the wind in order to measure the wind velocity produce forces that vary as the square of the wind speed and hence produce very small forces at very low wind speeds.

DESCRIPTION OF THE PREFERRED EMBODIMENT(S)

Figure 1:
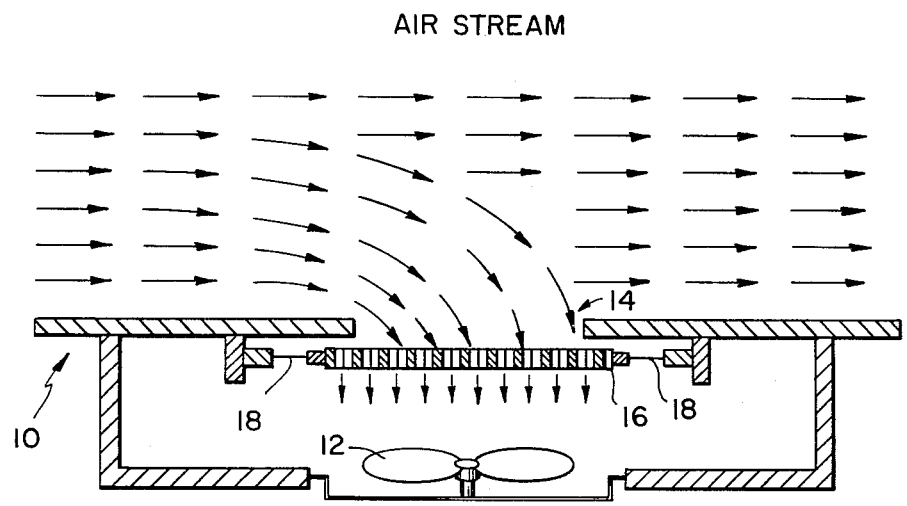
FIG. 1 is a schematic illustration of a preferred embodiment of my invention.

The preferred embodiment of the invention is shown in FIG. 1 wherein a portion of the environmental airstream, carrying its proper momentum, is drawn into a device 10 from which it emerges with no horizontal momentum and thus exerts on that device a force equal to the momentum flux of the indrawn air, in such a manner that the force may be measured. Referring to FIG. 1, a fan 12 or other suitable device draws air through an inlet 14 and through a honeycomb of vertical passages 16 in the throat of the inlet so that the air emerges from the honeycomb with no horizontal momentum therein. The horizontal momentum flux of the indrawn air is then exerted as a horizontal force against the freely suspended honeycomb so that a wind causes the honeycomb to be thrust in the downwind direction by a force equal to the horizontal momentum flux of the indrawn air. Strain gages 18 measure the components of horizontal force on the honeycomb 16. If the airstream has a horizontal velocity of 10 cm/sec and is drawn through the honeycomb with an area of 0.1 m² at a rate of 100 gram/sec, the momentum flux and therefore the horizontal force exerted on the honeycomb is 1,000 dynes, equivalent to a weight of about 1 gram. This is an amplification of about 170 times over the force exerted by the wind on an object the size of such an inlet. This embodiment is particularly advantageous in that it includes the property of being an "absolute" instrument requiring no calibration; there is an exact equality, not simply proportionality, between the momentum of the indrawn air and the force exerted on the inlet, and the latter is therefore an absolute measure of the former regardless of the geometric details of the device or of frictional losses in the airstream.

Figure 2:
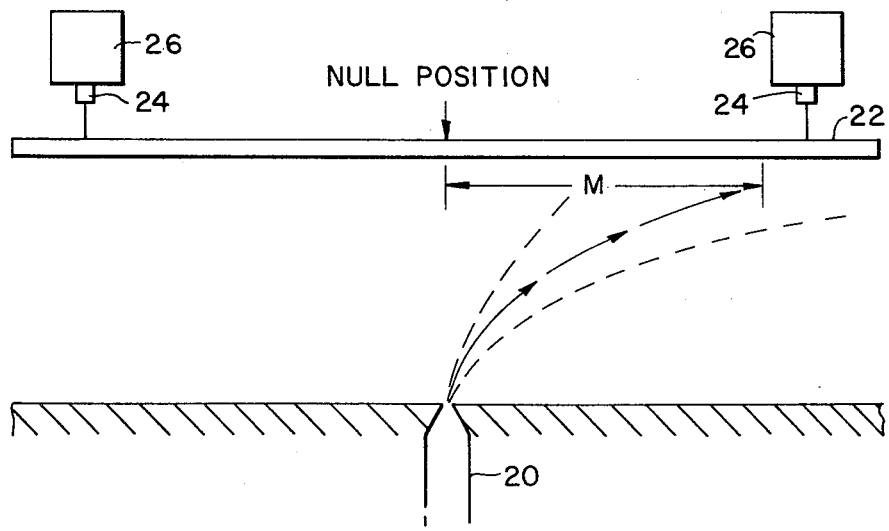
FIG. 2 is a schematic illustration of an alternative embodiment of my invention.

An alternative embodiment of the invention is shown in FIG. 2 wherein a jet of air from a source 20 is projected vertically into the environmental air or airstream moving horizontally passed it. The jet entrains a portion of the airstream in the wakestream of the jet so that at a distance from the source 20 the wakestream contains both the vertical momentum delivered to it by its source and conserved thereafter, and the horizontal momentum of the entrained air. The core of the wakestream becomes tilted at an angle, as shown by the arrows, the tangent of which is the ratio of the horizontal to the vertical momenta, causing the wakestream core to follow a parabolic curve in the downwind direction, that is to the right as shown in FIG. 2. The jet is directed through a predetermined thickness, such as for example 35 cm, of the airstream from the source to impinge on a flat plate 22 engaged to vertical-force transducers 24 which in turn are secured to supports 26. The plate 22 as shown is normal to the original direction of the jet. The momentum of the wakestream core is converted into a force exerted on the plate 22, the center of the force being the locus of the jet core. Deflection of the core from its null position therefore generates a force moment about the null position equal to the jet momentum times the length of its deflection from the null position. If the jet momentum is $10^3$ dynes, and the wind speed is 10 cm/sec, for the example of FIG. 2, the deflection of the core from its null position will be about 1 cm and the force moment $10^3$ dynes-cm or about 1 gram-cm. This is about 200 times the force that the same wind speed would exert on a flat plate the size of the impact area of the wakestream, and represents a magnification of force through utilization of the momentum of the environmental air entrained into the wakestream as a means of controlling the wakestream.

The invention, of course, may employ any type of transducer which would convert the force acting on an element into a signal that may be measured; for example, a spring balance, a strain gage, or other device that will occur to persons skilled in instrumentation strain gauges which may be used with the invention would include, for example, a gauge such as manufactured by BLH, Inc., Waltham, Massachusetts, Model No. FAW–03G = 12–59.

In FIG. 2, the air jet has been shown being directed in a direction normal to the airstream and normal to the transducer 24. Of course, the air jet may be directed normal to the transducer and at an angle to the airstream or normal to the airstream and at an angle to the transducer or at an angle to both the airstream and the transducer. However, embodiments where the air jet is not in a direction normal to both the airstream and the transducer would involve additional calculations.

Further, the particular design of FIG. 1 shows a circular inlet 14 directly over the honeycomb 16. Other embodiments may be employed. The orifice may be of a noncircular configuration and the orifice may be flared. Also, other devices may be used for measuring the force exerted on the flat plate in the second embodiment and the honeycomb in the first embodiment which may vary from a simple spring balance, sets of strain gages, coupled with means of exerting a restoring force equal and opposite to the force exerted by the wind.

Since the honeycomb sensing element in the anemometer system of FIG. 1 can be wholly enclosed in a housing, and since the force exerted on it can be reduced by reducing the amount of air drawn through it, this anemometer lends itself to "ruggedization" for use in extremely severe wind situations such as hurricanes and tornadoes, making measurements in the wakestream of a jet engine, etc. For some of these applications, it is advisable to adopt some such arrangements as shown in FIGS. 3 and 4.

Figure 3:
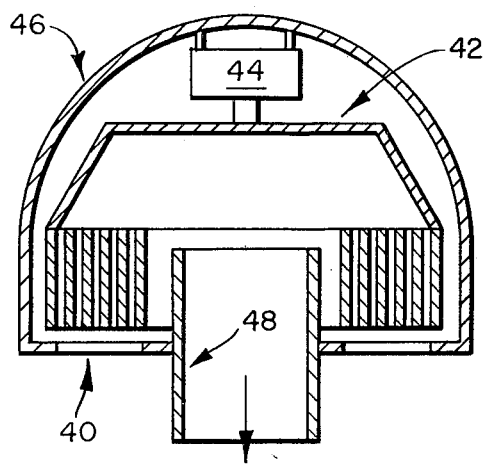
FIGS. 3 and 4 are schematic illustrations of the invention employed with high wind velocities.

In FIG. 3 a honeycomb 40 on support 42 connected to strain gage system 44 is protected by housing 46 that is firmly connected by stand-offs (not shown) to steel pipe 48 that serves as support and is connected to suction system (not shown) to draw air through the honeycomb.

Figure 4:
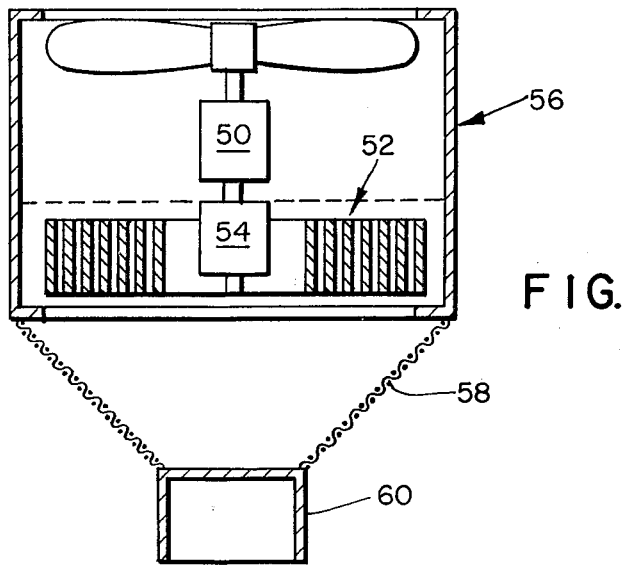

In FIG. 4 air is drawn by motor and fan 50 upwardly through honeycomb 52 which is mounted on force balance 54. Housing 56 is supported on open grill of rods 58 from base 60.

Figure 5:
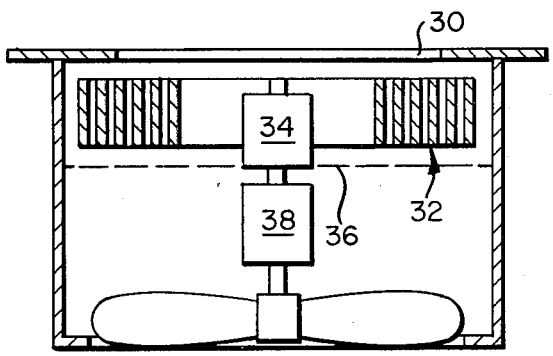
FIG. 5 is a schematic illustration of the invention used to measure the air vorticity.

The invention may also serve a further object, namely measuring the vorticity of the airstream. The vortical momentum of the air entering the honeycomb exerts a torque on it that may be measured by a suitably arranged strain gage system. Referring to FIG. 5, vorticity of air entering aperture 30 is converted by honeycomb 32 to a corresponding torque sensed by torque sensor 34 supported on support 36. Fan and motor 38 draw air through the honeycomb. Sensor 34 may be combined with sensors of horizontal forces for use simultaneously as a regular anemometer.

Accordingly, in my invention a device has been provided wherein the force transduced from a sample of the airstream is proportional to the first power of the wind speed and thus produces very large forces acting on the device at low wind speeds in comparison with the dynamic pressure of the wind.

Having described my invention, what I now claim is:

1. A device for measuring wind velocity which comprises:

means to displace a portion of an airstream from its flow path in a direction substantially normal to said flow path;

means to sense the momentum flux of the displaced portion of the airstream spaced apart from the means to displace the portion from the airstream in a direction substantially normal to the original flow path and to convert the momentum flux of the displaced portion of the airstream into a force directly proportional to that displaced momentum flux;

means responsive to the means to sense and convert to produce a signal representing said force; and means to measure the signal.

2. The device of claim 1 wherein the means to displace a portion of the airstream includes means to withdraw said portion from the airstream.

3. The device of claim 1 wherein the sensing and converting means is a honeycomb-like device and the means to produce a signal responsive to the force exerted on the walls of the honeycomb includes a strain gauge.

4. The device of claim 1 wherein the means to displace a portion of the airstream includes a jet stream injected into said airstream.

5. The device of claim 4 which includes means to direct said jet stream in a direction normal to the flow of said airstream.

6. The device of claim 4 which includes means to inject said jet stream in a direction normal to the means to sense and convert said momentum flux.

7. The device of claim 4 which includes means to introduce the jet stream in a direction normal to the flow of the airstream to the means and sense and convert momentum flux.

8. A device for measuring wind velocity which comprises:
means to withdraw a portion of an airstream from its flow path in a direction substantially normal to said flow path;
a honeycomb-like device axially aligned with and spaced apart from and intermediate the airstream and the means to withdraw a portion of the airstream from its flow path in a direction substantially normal to the original flow path, the walls of the honeycomb defining cavities therein, to sense and convert the momentum flux of the displaced portion of the air stream such that substantially only the momentum flux of the displaced portion of the airstream in its direction of flow is sensed and converted into a force directly proportional to that displaced momentum flux;
means responsive to the honeycomb-like device to measure the force exerted on the walls of the honeycomb secured to said honeycomb to produce an electrical signal representing said force; and
means to measure the signal.

9. A method for measuring the velocity of an airstream which includes;
displacing at least a portion of an airstream in a direction substantially normal to the flow path of said air stream;
sensing the momentum flux of the displaced portion of the airstream at a location spaced apart from the airstream displacing location in a direction substantially normal to the original flow path of the airstream and converting the momentum flux of the displaced portion of the airstream into a force directly proportional to that displaced momentum flux;
producing a signal corresponding to the force; and
measuring the signal so produced.

10. The method of claim 9 wherein the displacing of the airstream comprises injecting an air jet into the stream in a direction substantially normal to the flow of the airstream to displace a portion of the airstream.

11. The method of claim 9 wherein the displacing of the airstream comprises injecting normally into the airstream an air jet;
entraining in the wakestream of the air jet the horizontal component of momentum flux of the portion of the airstream whereby at a distance from its source the wakestream contains both the vertical momentum flux of the air jet delivered to it at the air jet source and the horizontal momentum flux of the entrained environmental air; and
measuring the force moment generated by deflection of the core of the wakestream from its null position.

12. The method of claim 9 wherein the displacing of the airstream comprises withdrawing the portion of the airstream from the airstream;
exerting a deflecting force on a previously positioned transducer with the horizontal component of momentum flux of said withdrawn portion; and
measuring the amount of deflecting force exerted on said transducer.

13. The method of claim 9 wherein the displaced momentum flux is a vortical momentum flux and the force measured is a torque.

* * * * *